US011956785B2

(12) United States Patent
Pezeshki et al.

(10) Patent No.: US 11,956,785 B2
(45) Date of Patent: Apr. 9, 2024

(54) USER EQUIPMENT PARTICIPATION INDICATIONS ASSOCIATED WITH FEDERATED LEARNING

(71) Applicant: QUALCOMM Incorporated, San Diego, CA (US)

(72) Inventors: Hamed Pezeshki, San Diego, CA (US); Taesang Yoo, San Diego, CA (US); Tao Luo, San Diego, CA (US); Eren Balevi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 17/447,668

(22) Filed: Sep. 14, 2021

(65) Prior Publication Data

US 2023/0080218 A1 Mar. 16, 2023

(51) Int. Cl.
*H04W 72/21* (2023.01)
*G06N 5/022* (2023.01)

(52) U.S. Cl.
CPC ............ *H04W 72/21* (2023.01); *G06N 5/022* (2013.01)

(58) Field of Classification Search
None
See application file for complete search history.

(56) References Cited

U.S. PATENT DOCUMENTS

| | | | | |
|---|---|---|---|---|
| 11,843,516 | B2* | 12/2023 | Ouyang | ............... H04L 41/16 |
| 2020/0005071 | A1* | 1/2020 | Kim | ................... G06V 30/416 |
| 2022/0114475 | A1* | 4/2022 | Zhu | ..................... G06N 3/084 |
| 2022/0394629 | A1* | 12/2022 | Lau | ..................... H04W 52/16 |
| 2023/0171168 | A1* | 6/2023 | Kedalagudde | ...... H04L 41/0894 370/254 |
| 2023/0289656 | A1* | 9/2023 | Butt | ..................... H04L 41/16 |
| 2023/0325644 | A1* | 10/2023 | Afrabandpey | ....... G06N 3/0495 |

FOREIGN PATENT DOCUMENTS

CN 112367109 A 2/2021

OTHER PUBLICATIONS

International Search Report and Written Opinion—PCT/US2022/074338—ISA/EPO—dated Nov. 15, 2022.

(Continued)

*Primary Examiner* — Hassan A Phillips
*Assistant Examiner* — Gautam Sharma
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a federated learning configuration that configures a participation indication to be used by the UE to indicate a participation status of the UE associated with at least one federated learning round corresponding to a machine learning component. The UE may transmit the participation indication to the base station based at least in part on the federated learning configuration. Numerous other aspects are described.

20 Claims, 8 Drawing Sheets

(56) References Cited

OTHER PUBLICATIONS

Le T.H.T., et al., "An Incentive Mechanism for Federated Learning in Wireless Cellular Networks: An Auction Approach", IEEE Transactions on Wireless Communications, IEEE Service Center, Piscataway, NJ, US, vol. 20, No. 8, Mar. 8, 2021, pp. 4874-4887, XP011871043, ISSN: 1536-1276, DOI: 10.1109/TWC.2021.3062708 [retrieved on Aug. 10, 2021] p. 2, figure 4.
Li L., et al., "SmartPC: Hierarchical Pace Control in Real-Time Federated Learning System", 2019 IEEE Real-Time Systems Symposium (RTSS), IEEE, Dec. 3, 2019, pp. 406-418, XP033753005, DOI: 10.1109/RTSS46320.2019.00043 [retrieved on Mar. 31, 2020] p. 5, figures 5, 6.

\* cited by examiner

USER EQUIPMENT PARTICIPATION INDICATIONS ASSOCIATED WITH FEDERATED LEARNING

FIELD OF THE DISCLOSURE

Aspects of the present disclosure generally relate to wireless communication and to techniques and apparatuses for user equipment participation indications associated with federated learning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
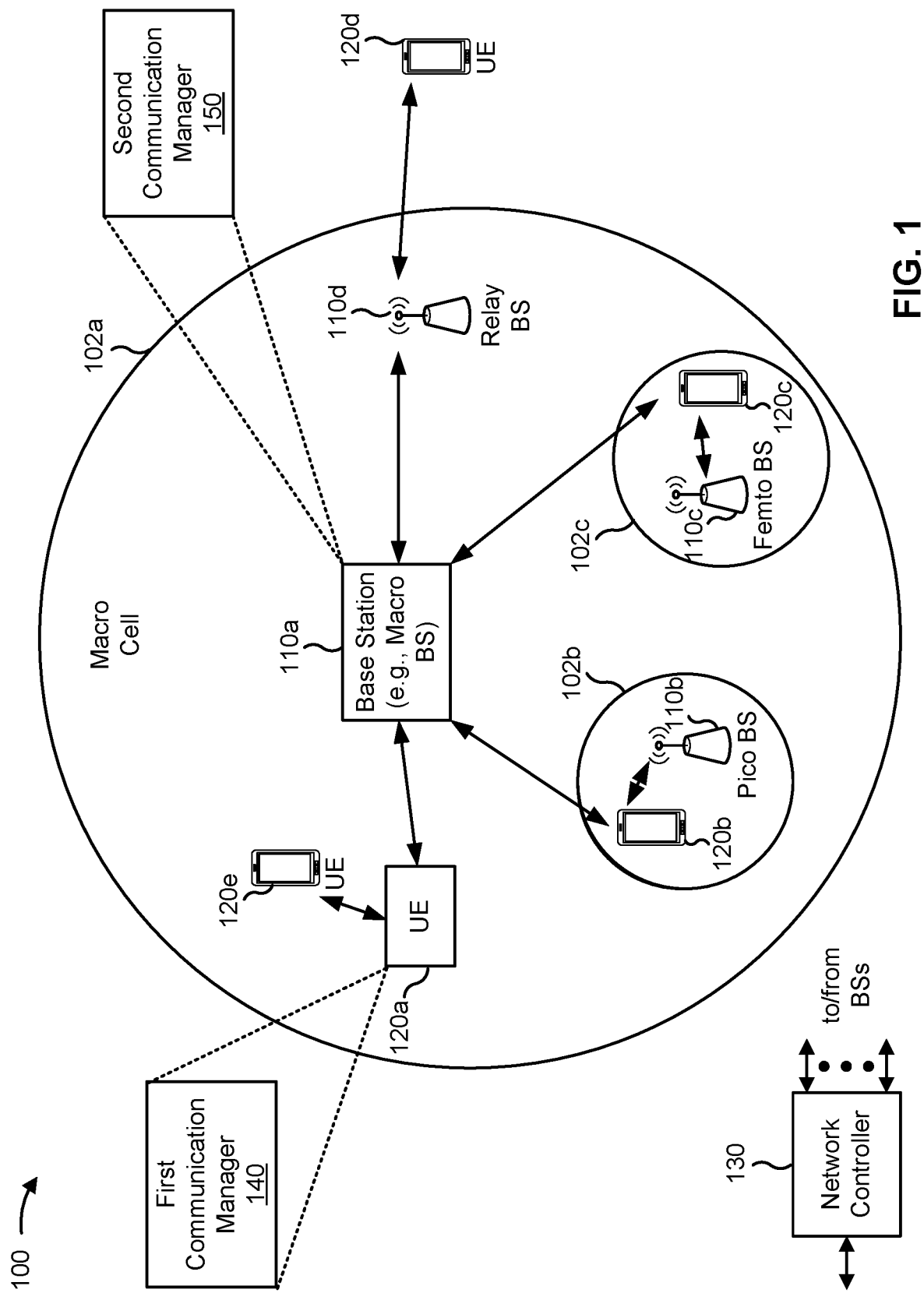
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a first communication manager 140. As described in more detail elsewhere herein, the first communication manager 140 may receive, from a base station, a federated learning configuration that configures a participation indication to be used by the UE to indicate a participation status of the UE associated with at least one federated learning round corresponding to a machine learning component; and transmit the participation indication to the base station based at least in part on the federated learning configuration. Additionally, or alternatively, the first communication manager 140 may perform one or more other operations described herein.

In some aspects, the base station 110 may include a second communication manager 150. As described in more detail elsewhere herein, the second communication manager 150 may transmit, to a UE, a federated learning configuration that configures a participation indication to be used by the UE to indicate a participation status of the UE associated with at least one federated learning round corresponding to a machine learning component; and receive the participation indication from the UE based at least in part on the federated learning configuration. Additionally, or alternatively, the second communication manager 150 may perform one or more other operations described herein.

As indicated above, FIG. 1 is provided as an example. Other examples may differ from what is described with regard to FIG. 1.

Figure 2:
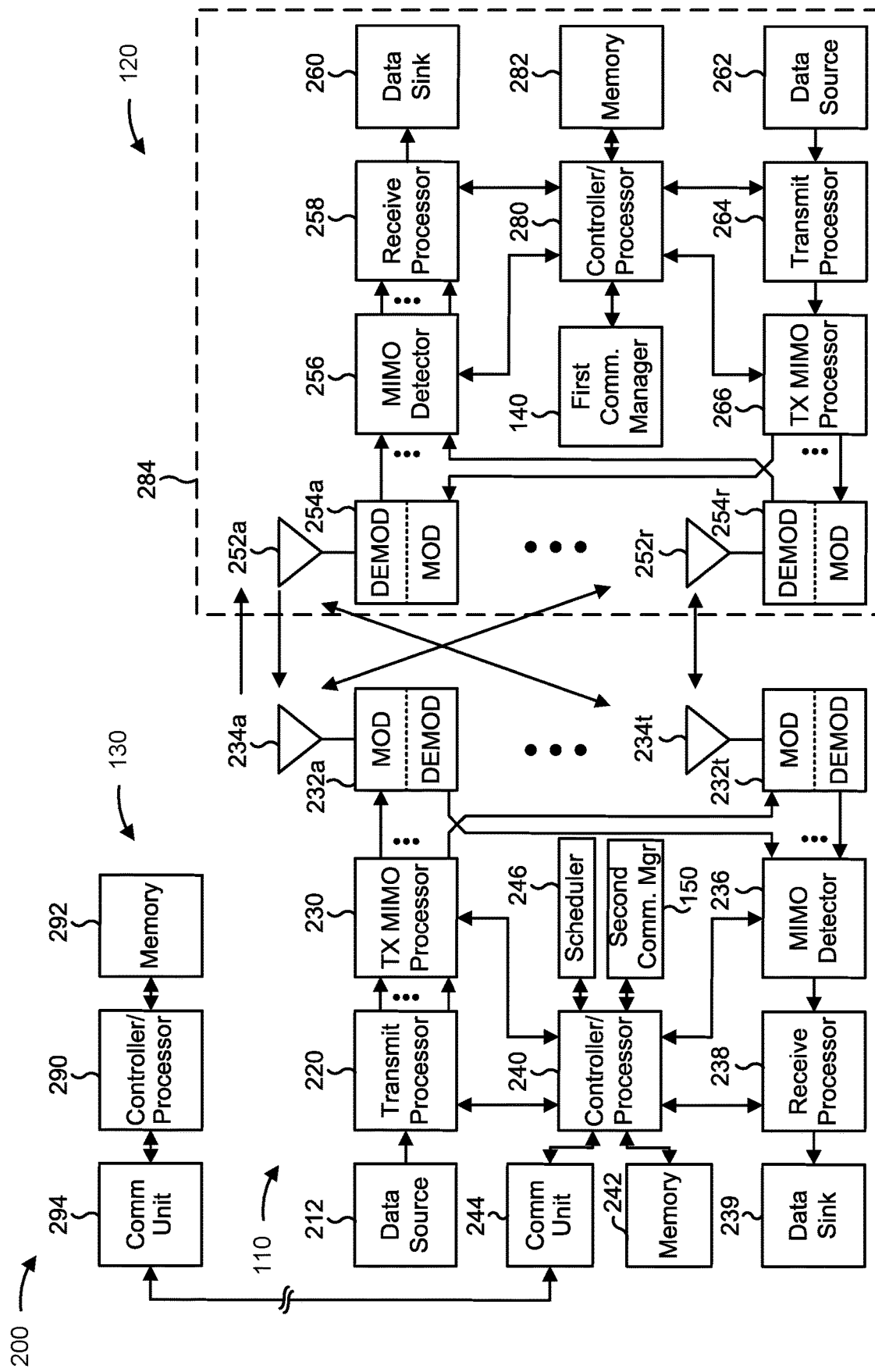
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving RF signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication is an indication of a beam. A beam indication may be, or include, a TCI state information element, a beam identifier (ID), spatial relation information, a TCI state ID, a close loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

Beam indications may be provided for carrier aggregation (CA) scenarios. In a unified TCI framework, the network may support common TCI state identifier (ID) update and activation to provide common quasi co-location (QCL) information and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with UE participation indications associated with federated learning, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE includes means for receiving, from a base station, a federated learning configuration that configures a participation indication to be used by the UE to indicate a participation status of the UE associated with at least one federated learning round corresponding to a machine learning component; and/or means for transmitting the participation indication to the base station based at least in part on the federated learning configuration. The means for the UE to perform operations described herein may include, for example, one or more of first communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a federated learning configuration that configures a participation indication to be used by the UE to indicate a participation status of the UE associated with at least one federated learning round corresponding to a machine learning component; and/or means for receiving the participation indication from the UE based at least in part on the federated learning configuration. The means for the base station to perform operations described herein may include, for example, one or more of second communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A UE operating in a network may utilize a machine learning component for any number of different types of operations, transmissions, user experience enhancements, and/or the like. For example, in some cases, a UE may use one or more machine learning components to report, to a base station, information associated with received signals, user interactions with the UE, and/or positioning information, among other examples. For example, a UE may perform measurements associated with reference signals and use one or more machine learning components to facilitate reporting the measurements to a base station. In some examples, the UE may measure reference signals during a beam management process for channel state feedback (CSF), may measure received power of reference signals from a serving cell and/or neighbor cells, may measure signal strength of inter-radio access technology (e.g., WiFi) networks, may measure sensor signals for detecting locations of one or more objects within an environment, and/or the like. In some examples, a UE may use one or more machine learning components to use data associated with a user's interaction with the UE to customize or otherwise enhance a user experience with a user interface.

A machine learning component is a component (e.g., hardware, software, or a combination thereof) of a device (e.g., a client device, a server device, a UE, a base station, etc.) that performs one or more machine learning procedures. A machine learning component may include, for example, hardware and/or software that may learn to perform a procedure without being explicitly trained to perform the procedure. A machine learning component may include, for example, a feature learning processing block and/or a representation learning processing block. A machine learning component may include one or more neural networks. A neural network may include, for example, an autoencoder.

In some cases, machine learning components may be trained using federated learning. Federated learning is a machine learning technique that enables multiple clients to collaboratively train machine learning models based on training data, while the server device does not collect the training data from the client devices. Federated learning techniques may involve one or more global neural network models trained from data stored on multiple client devices (e.g., UEs).

Figure 3:
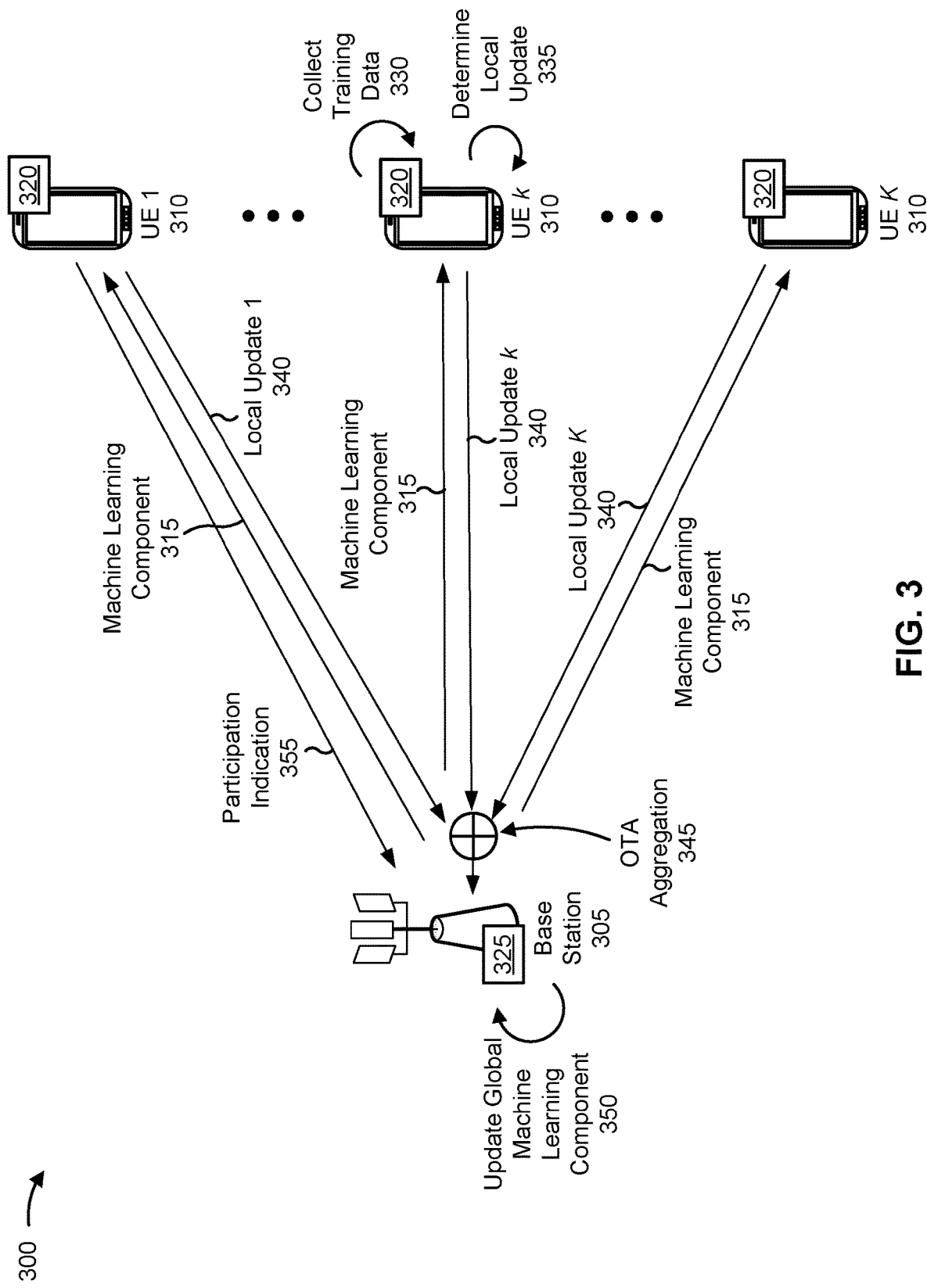
FIG. 3 is a diagram illustrating an example associated with over-the-air (OTA) aggregation in federated learning, in accordance with the present disclosure.

FIG. 3 is a diagram illustrating an example 300 of over-the-air (OTA) update aggregation in federated learning, in accordance with the present disclosure. As shown, a base station 305 may communicate with a set of K UEs 310 (shown as UE 1, ..., UE k, ..., UE K). The base station 305 and the UEs 310 may communicate with one another via a wireless network (e.g., the wireless network 100 shown in FIG. 1). In some aspects, any number of additional UEs 310 may be included in the set of K UEs 310. The base station 305 may be, or be similar to, base station 110 shown in FIG. 1. One or more of the UEs 310 may be, or be similar to, UE 120 shown in FIG. 1.

As shown by reference number 315, the base station 305 may transmit a machine learning component to each of the UEs in the set of K UEs. As shown, the UEs 310 may include a first communication manager 320, which may be, or be similar to, the first communication manager 140 shown in FIG. 1. The first communication manager 320 may be configured to utilize the machine learning component to perform one or more wireless communication tasks and/or one or more user interface tasks. The first communication manager 320 may be configured to utilize any number of additional machine learning components.

As shown in FIG. 3, the base station 305 may include a second communication manager 325, which may be, or be similar to, the second communication manager 150 shown in FIG. 1. The second communication manager 325 may be configured to utilize a global machine learning component to perform one or more wireless communication tasks, to perform one or more user interface tasks, and/or to facilitate federated learning associated with the machine learning component.

The UEs 310 may locally train the machine learning component using training data collected by the UEs, respectively. A UE 310 may train a machine learning component such as a neural network by optimizing a set of model parameters, $w^{(n)}$, associated with the machine learning component, where n is the federated learning round index. The set of UEs 310 may be configured to provide updates to the base station 305 multiple times (e.g., periodically, on demand, upon updating a local machine learning component, etc.).

"Federated learning round" refers to the training done by a UE 310 that corresponds to an update provided by the UE 310 to the base station 305. In some aspects, "federated learning round" may refer to the transmission by a UE 310, and the reception by the base station 305, of an update. The federated learning round index n indicates the number of the rounds since the last global update was transmitted by the base station 305 to the UE 310. The initial provisioning of a machine learning component on a UE 310, the transmission of a global update to the machine learning component to a UE 310, and/or the like may trigger the beginning of a new round of federated learning.

In some aspects, for example, the first communication manager 320 of the UE 310 may determine an update corresponding to the machine learning component by training the machine learning component. In some aspects, as shown by reference number 330, the UEs 310 may collect training data and store it in memory devices. The stored training data may be referred to as a "local dataset." As shown by reference number 335, the UEs 310 may each determine a local update associated with the machine learning component.

In some aspects, for example, the first communication manager 320 may access training data from the memory device and use the training data to determine an input vector, $x_j$, to be input into the machine learning component to generate a training output, $y_j$, from the machine learning component. The input vector x, may include an array of input values, and the training output $y_j$ may include a value (e.g., a value between 0 and 9).

The training output $y_j$ may be used to facilitate determining the model parameters $w^{(n)}$ that maximize a variational lower bound function. A negative variational lower bound function, which is the negative of the variational lower bound function, may correspond to a local loss function, $F_k(W)$, which may be expressed as:

$$F_k(w) = \frac{1}{|D_k|} \sum\nolimits_{(x_j, y_j) \in D_k} f(w, x_j, y_j),$$

where $D_k$ is the size of the local dataset associated with the UE k. A stochastic gradient descent (SGD) algorithm may be used to optimize the model parameters $w^{(n)}$. The first communication manager 320 may perform one or more SGD procedures to determine the optimized parameters $w^{(n)}$ and may determine the gradients, $g_k^{(n)} = \nabla F_k(w^{(n)})$, of the loss function F(w). The first communication manager 320 may further refine the machine learning component based at least in part on the loss function value, the gradients, and/or the like.

By repeating this process of training the machine learning component to determine the gradients $g_k^{(n)}$ a number of times, the first communication manager 320 may determine an update corresponding to the machine learning component. Each repetition of the training procedure described above may be referred to as an epoch. In some aspects, the update may include an updated set of model parameters $w^{(n)}$, a difference between the updated set of model parameters $w^{(n)}$ and a prior set of model parameters $w^{(n-1)}$, the set of gradients $g_k^{(n)}$, an updated machine learning component (e.g., an updated neural network model), and/or the like.

As shown by reference number 340, the UEs 310 may transmit their respective local updates (shown as "local update 1, . . . , local update k, . . . , local update K"). In some aspects, the local update may include a compressed version of a local update. For example, in some aspects, a UE 310 may transmit a compressed set of gradients, $\tilde{g}_k^{(n)} = q(g_k^{(n)})$, where q represents a compression scheme applied to the set of gradients $g_k^{(n)}$.

In some cases, the base station 305 (e.g., using the second communication manager 325) may aggregate the updates received from the UEs 310. For example, the second communication manager 325 may average the received gradients to determine an aggregated update, which may be expressed as $$g^{(n)} = \frac{1}{K} \sum_{k=1}^{K} \tilde{g}_k^{(n)},$$

where, as explained above, K is the total number of UEs 310 from which updates were received. In some examples, the second communication manager 325 may aggregate the received updates using any number of other aggregation techniques.

As shown by reference number 345, in some aspects, aggregation of the updates may be accomplished over the air. For example, the base station 305 may allocate communication resources (e.g., time, frequency, and/or spatial resources) of a wireless multiple access channel such that two or more of the UEs 310 transmit respective local updates simultaneously (or within a specified time period such as, for example, during a same slot or slots). In this case, the respective transmitted updates can be aggregated using the superposition property of the wireless multiple access channel. The base station 305 may receive a signal that includes an aggregation, via superposition, of the local updates. In this way, rather than determining each individual update from the received signal and using computing resources of the second communication manager 325 to identify and aggregate the separate local updates, the base station 305 may use OTA update aggregation in which the aggregated updates received in the signal are used to update a global machine learning component.

As shown by reference number 350, the second communication manager 325 may update the global machine learning component based on the aggregated updates. In some aspects, for example, the second communication manager 325 may update the global machine learning component by normalizing the local datasets by treating all of the dataset sizes, $D_k$, as being equal. The second communication manager 325 may update the global machine learning component using multiple rounds of updates from the UEs 310 until a global loss function is minimized. The global loss function may be given, for example, by:

$$F(w) = \frac{\sum_{k=1}^{K} \sum_{j \in D_k} f_j(w)}{K * D} = \frac{1}{K} \sum_{k=1}^{K} F_k(w),$$

where $D_k = D$, and where D is a normalized constant. In some aspects, the base station 305 may transmit an update associated with the updated global machine learning component to the UEs 310.

The aggregation of updates using the superposition property may facilitate efficient updating of machine learning components using federated learning. However, since the signal that the base station 305 receives is an aggregated update (e.g., a sum of the gradient vectors transmitted from the multiple UEs 310), the base station 305 may not have visibility into which UEs 310 transmitted updates and/or how many UEs 310 transmitted updates that were aggregated to create the received signal. In this way, the accuracy of the aggregated updates may be compromised, which may result in additional federated learning rounds, leading to more communication overhead than is saved by utilizing OTA aggregation.

Aspects of the techniques and apparatuses described herein may provide for UE participation indications associated with federated learning. In some aspects, a UE may receive a machine learning component from a base station and may locally train the machine learning component to determine a local update associated with the machine learning component. In some aspects, the base station may provide a federated learning configuration to the UE. The federated learning configuration may configure a participation indication to be used by the UE to indicate a participation status of the UE associated with at least one federated learning round corresponding to the machine learning component. For example, as shown in FIG. 3, the UE 1 310 may transmit a participation indication 355 to the base station 305. The participation indication may indicate whether the UE 1 310 participated in a prior federated learning round and/or whether the UE 1 310 will participate in a future federated learning round. If the participation indication indicates that the UE 1 310 did not and/or will not participate in a federated learning round, the participation indication 355 may include participation status information that indicates a reason associated with the non-participation. In some aspects, the base station 305 may use that information to configure or reconfigure a future federated learning round. In some aspects, each of the UEs 310 may provide a participation indication. In this way, a base station may be able to determine which UEs and/or how many UEs contributed to an aggregated update. Thus, aspects described herein may enable OTA aggregation for federated learning by facilitating accuracy of the aggregated updates. As a result, aspects of the techniques and apparatuses described herein may result in reduced communication overhead and positive impacts on network performance, and/or the like.

As indicated above, FIG. 3 is provided merely as an example. Other examples may differ from what is described with regard to FIG. 3.

Figure 4:
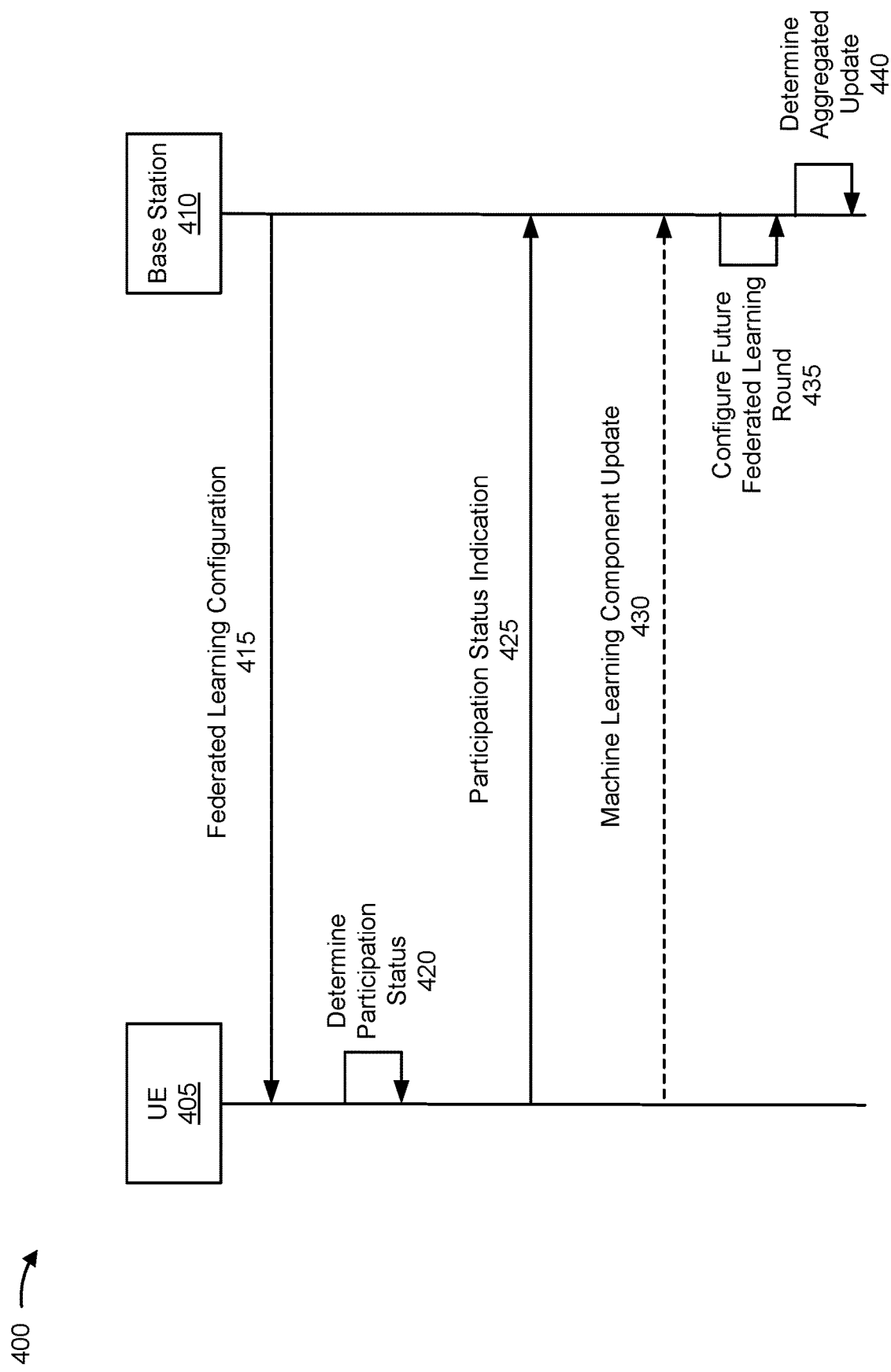
FIG. 4 is a diagram illustrating an example associated with UE participation indications associated with federated learning, in accordance with the present disclosure.

FIG. 4 is a diagram illustrating an example 400 associated with UE participation indications associated with federated learning, in accordance with the present disclosure. As shown, a UE 405 and a base station 410 may communicate with one another. The UE 405 and the base station 410 may communicate using a wireless network (e.g., wireless network 100 shown in FIG. 1). The UE 405 may be, or be similar to, the UE 120 shown in FIG. 1. The base station 410 may be, or be similar to, the base station 110 shown in FIG. 1. In some aspects, any number of additional UEs 405 may communicate with the base station 410.

As shown by reference number 415, the base station 410 may transmit, and the UE 405 may receive, a federated learning configuration. The federated learning configuration may be carried, for example, in a radio resource control (RRC) message. The federated learning configuration may configure a participation indication to be used by the UE 405 to indicate a participation status of the UE 405 associated with at least one federated learning round corresponding to a machine learning component. The at least one federated learning round may include at least one of a prior federated learning round or a future federated learning round. The machine learning component may include, for example, at least one neural network model. The UE 405 may determine an update to the machine learning component during a federated learning round. The update may include, for example, a local update determined by the UE 405.

As shown by reference number 420, the UE 405 may determine a participation status and, as shown by reference number 425, the UE 405 may transmit, and the base station 410 may receive, a participation indication that indicates the participation status. The UE 405 may transmit the participation indication by transmitting at least one of a physical uplink control channel (PUCCH) communication that includes the participation indication or a medium access control control element (MAC CE) that includes the participation indication.

The participation indication may include an indication of whether the UE 405 participated in a prior federated learning round and/or an indication of whether the UE 405 will participate in a future federated learning round. For example, the participation indication may include an indication that the UE 405 participated in a prior federated learning round, an indication that the UE 405 did not participate in the prior federated learning round, an indication that the UE will participate in a future federated learning round, or an indication that the UE will not participate in the future federated learning round. In some aspects, for example, the indication may be a binary indication that indicates one of two possible participation statuses. In some aspects, the participation indication may include an indication associated with a prior federated learning round and an indication associated with a future federated learning round.

A prior federated learning round may be an immediately prior federated learning round (e.g., a last round), a specified prior federated learning round (e.g., a prior federated learning round that occurred during a specified time period or a prior federated learning round that is otherwise specified based on a number of completed federated learning rounds, a number of participating UEs, and/or an amount of local data used for determining the update, among other examples), and/or a set of prior federated learning rounds, among other examples. Similarly, a future federated learning round may be an immediately future federated learning round (e.g., a next round), a specified future federated learning round (e.g., a future federated learning round that is scheduled to occur during a specified time period or a future federated learning round that is otherwise specified based on a number of completed federated learning rounds, a number of participating UEs, and/or an amount of local data to be used for determining the update, among other examples), and/or a set of future federated learning rounds, among other examples.

In some aspects, a set of UEs may be anticipated, by a base station, to participate in a federated learning round by default. For example, if the base station 410 does not receive a participation indication the UE 405, the base station 410 may assume that the UE 405 had participated in a prior federated learning round. If the UE 405 did not participate in the federated learning round, the UE 405 may transmit a participation indication to indicate that the UE 405 did not participate in the federated learning round.

In some aspects, the UE 405 may transmit the participation indication before an occurrence of a specified OTA aggregation occasion. An OTA aggregation occasion is a time period and/or time domain resource corresponding to an OTA aggregation. For example, an OTA aggregation occasion may be a time domain resource that is scheduled by, and/or reserved by, the base station 410 for OTA aggregation of two or more uplink transmissions from two or more UEs. In some aspects, an OTA aggregation occasion may be a time period during which two or more uplink transmissions are aggregated over the air.

In some aspects, the UE 405 may transmit the participation indication after an occurrence of an OTA aggregation occasion. In that case, the UE 405 may transmit the participation indication before a federated averaging instance associated with a last federated learning round, so that the base station 410 receives the participation indication in time to use the information conveyed by the participation indication in performing the federated averaging. To facilitate receiving the participation indication in time to use the information for the federated averaging, the base station 410 may transmit, and the UE 405 may receive, a configuration of a participation indication deadline that is based at least in part on the federated averaging instance. The participation indication deadline may be a time or time period by which the UE 405 is to transmit the participation indication. The configuration of the participation indication deadline may be part of the federated learning configuration and may be transmitted at the same time as other aspects of the federated learning configuration or at a different time.

In some aspects, if a UE 405 did not participate in a specified prior federated learning round or will not participate in a specified future federated learning round, the UE 405 may include, in the participation indication, information that indicates a reason for the lack of participation. For example, the participation indication may include participation status information associated with the participation status. In some aspects, the participation status information may include at least one of an indication of a poor channel condition, an indication that an update associated with the machine learning component is not ready, an indication of a low UE battery, or an indication of an adverse maximum permissible exposure condition. For example, the UE 405 may determine that there's a human body part in the direction of the UL beam within a certain distance from the UE 405. The UE 405 may determine, based at least in part on the proximity of the body part, that an adverse maximum permissible exposure condition exists (e.g., the UE 405 may determine that, if the UE 405 were to transmit at a current power level, the resulting electromagnetic radiation would exceed a maximum permissible exposure level indicated by regulations). In response to determining the existence of the adverse maximum permissible exposure condition, the UE 405 may reduce the transmit power of the UE 405 to a compliant level. However, since OTA aggregation may be more effective when transmit power can be controlled (e.g., to equalize received power from a number of UEs at the base station 410), the UE 405 may determine that participation in a current or future federated learning round is not appropriate. As a result, the UE 405 may transmit a participation indication to the base station 410 to indicate that the UE 405 is not participating in the federated learning round. As shown by reference number 435, the base station 410 may configure (or reconfigure) a future federated learning round based at least in part on the participation status information.

In some aspects, for example, it may be the case that the UE 405 is scheduled to participate in OTA aggregation but experiences a poor channel (e.g., due to fading, interference, etc.) and thus cannot perform power control in such a way that the received power at the base station 410 reaches a specified minimum level. If this is the case, UE 405 may include this reason in the participation indication. In some aspects, the base station 410 may exclude the UE 405 from the next federated learning round or for all future federated learning rounds until the base station 410 obtains information indicating that the channel has improved to a specified degree, among other examples. In some aspects, if the base station 410 consistently receives this information from UE (e.g., in two or more successive participation indications, in three or more successive participation indications, in some other specified number of successive participation indications, and/or in a specified number of participation indications received within a specified time period, among other examples), this may affect scheduling and grouping decisions at the base station 410. For example, the base station 410 may exclude the UE 405 from participation in OTA aggregation for a specified number of times and/or a specified number of federated learning rounds.

In some aspects, the UE 405 may not have an update ready to transmit when the time for transmission is approaching. For example, the federated learning configuration may specify one or more criteria associated with local federated learning rounds to be performed by the UE 405 that must be satisfied for the UE 405 to transmit an update. For example, the base station 410 may configure the UE 405 to perform a certain number of local epochs. Due to the machine learning capability of the UE 405 or the involvement of the UE with other tasks, the gradient vector may not be ready by the deadline set by the base station 410 for OTA aggregation. The UE 405 may include information that indicates this situation in the participation indication. This information may be useful to the base station 410 in any number of ways. For example, the base station 410 may include the UE 405 in an OTA aggregation group that includes UEs that are performing local updates at a similar rate, so as not to slow down other UEs that are generating updates at a faster rate. In some aspects, for example, the UE 405 may be associated with a first OTA aggregation group and the base station 410, based at least in part on determining that the participation status information includes an indication that the update associated with the machine learning component is not ready, may associate the UE with a second OTA aggregation group.

As shown by reference number 430, the UE 405 may transmit, and the base station 410 may receive, a machine learning component update. The UE 405 may transmit the update based at least in part on a resource allocation, the federated learning configuration, and/or the like. In some aspects, the update may include one or more gradients of a local loss function corresponding to the machine learning component. In some aspects, the machine learning component update may be one of several machine learning component updates being transmitted to the base station 410 for OTA gradient aggregation, for example. As shown by reference number 440, the base station 410 may determine an aggregated update from the received signal and may use the aggregated update for updating the machine learning component.

As indicated above, FIG. 4 is provided merely as an example. Other examples may differ from what is described with regard to FIG. 4.

Figure 5:
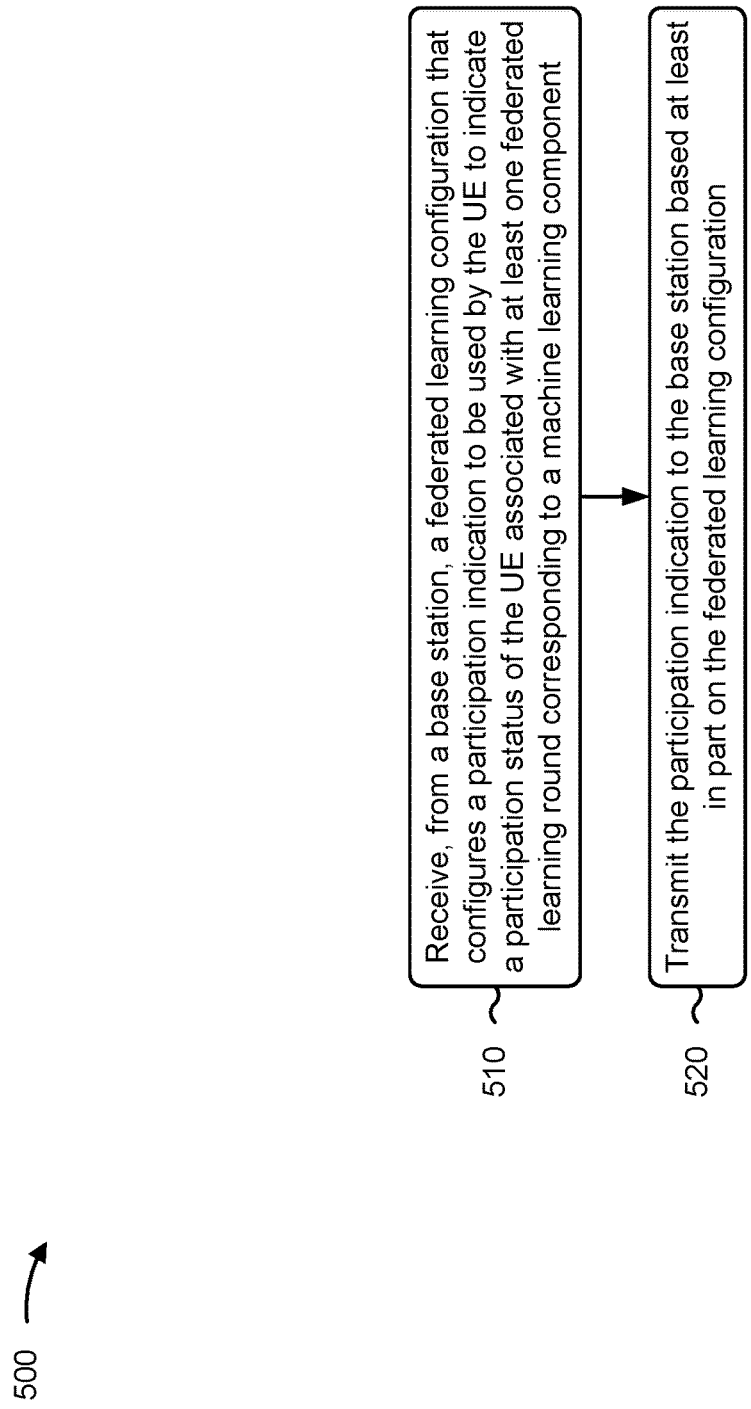
FIGS. 5 and 6 are diagrams illustrating example processes associated with UE participation indications associated with federated learning, in accordance with the present disclosure.

FIG. 5 is a diagram illustrating an example process 500 performed, for example, by a UE, in accordance with the present disclosure. Example process 500 is an example where the UE (e.g., UE 405) performs operations associated with UE participation indications associated with federated learning.

As shown in FIG. 5, in some aspects, process 500 may include receiving, from a base station, a federated learning configuration that configures a participation indication to be used by the UE to indicate a participation status of the UE associated with at least one federated learning round corresponding to a machine learning component (block 510). For example, the UE (e.g., using first communication manager 140 and/or reception component 702, depicted in FIG. 7) may receive, from a base station, a federated learning configuration that configures a participation indication to be used by the UE to indicate a participation status of the UE associated with at least one federated learning round corresponding to a machine learning component, as described above.

As further shown in FIG. 5, in some aspects, process 500 may include transmitting the participation indication to the base station based at least in part on the federated learning configuration (block 520). For example, the UE (e.g., using first communication manager 140 and/or transmission component 704, depicted in FIG. 7) may transmit the participation indication to the base station based at least in part on the federated learning configuration, as described above.

Process 500 may include additional aspects, such as any single aspect or any combination of aspects described below and/or in connection with one or more other processes described elsewhere herein.

In a first aspect, the at least one federated learning round comprises at least one of a prior federated learning round or a future federated learning round.

In a second aspect, alone or in combination with the first aspect, the participation indication comprises an indication that the UE participated in a prior federated learning round, or an indication that the UE did not participate in the prior federated learning round.

In a third aspect, alone or in combination with one or more of the first and second aspects, the participation indication comprises an indication that the UE will participate in a future federated learning round, or an indication that the UE will not participate in the future federated learning round.

In a fourth aspect, alone or in combination with one or more of the first through third aspects, transmitting the participation indication comprises transmitting the participation indication before an occurrence of an OTA aggregation occasion.

In a fifth aspect, alone or in combination with one or more of the first through third aspects, transmitting the participation indication comprises transmitting the participation indication after an occurrence of an OTA aggregation occasion and before a federated averaging instance associated with a last federated learning round.

In a sixth aspect, alone or in combination with the fifth aspect, the federated learning configuration indicates a participation indication deadline that is based at least in part on the federated averaging instance.

In a seventh aspect, alone or in combination with one or more of the first through sixth aspects, transmitting the participation indication comprises transmitting at least one of a PUCCH communication that includes the participation indication or a MAC CE that includes the participation indication.

In an eighth aspect, alone or in combination with one or more of the first through seventh aspects, the participation indication comprises at least one of an indication that the UE did not participate in a prior federated learning round or an indication that the UE will not participate in a future federated learning round, and the participation indication comprises participation status information associated with the participation status.

In a ninth aspect, alone or in combination with the eighth aspect, the participation status information includes at least one of an indication of a poor channel condition, an indication that an update associated with the machine learning component is not ready, an indication of a low UE battery, or an indication of an adverse maximum permissible exposure condition.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
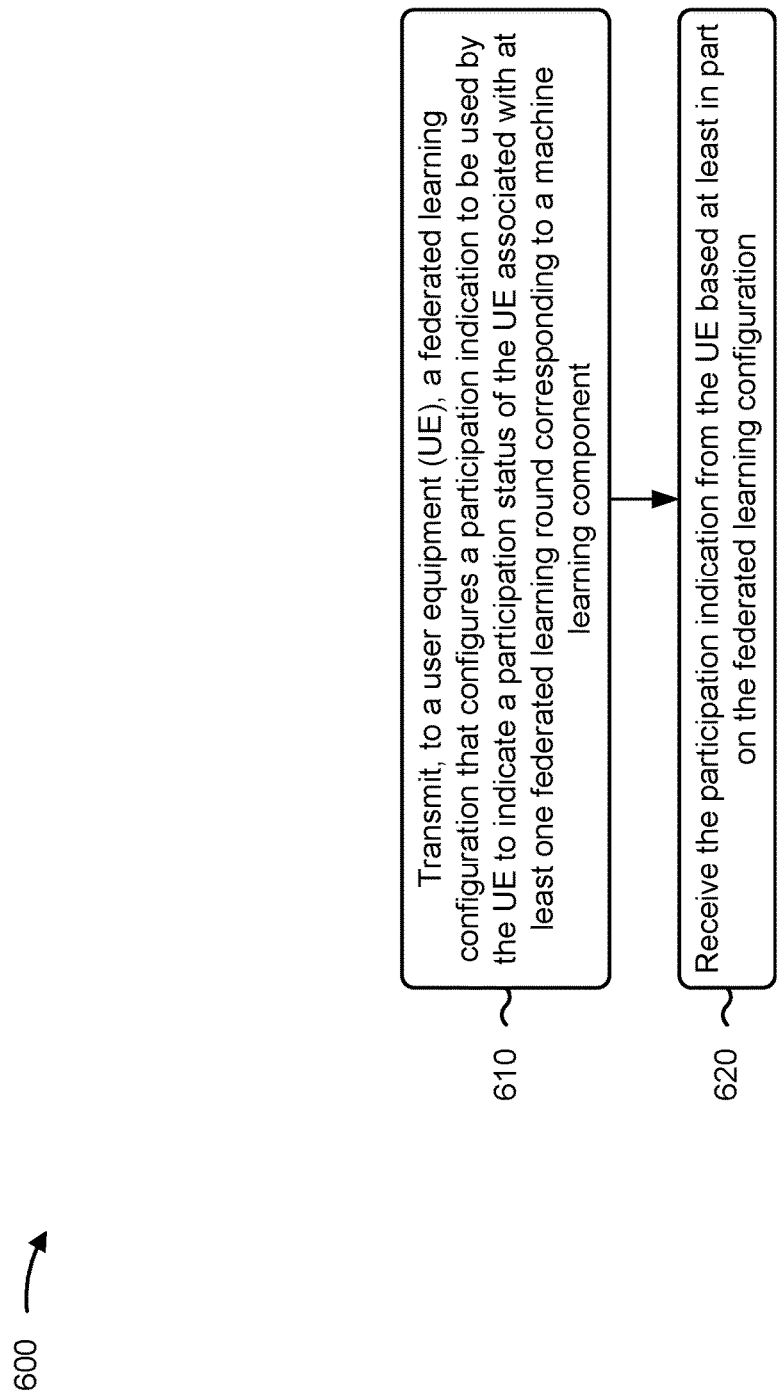

FIG. 6 is a diagram illustrating an example process 600 performed, for example, by a base station, in accordance with the present disclosure. Example process 600 is an example where the base station (e.g., base station 110) performs operations associated with UE participation indications associated with federated learning.

As shown in FIG. 6, in some aspects, process 600 may include transmitting, to a UE, a federated learning configuration that configures a participation indication to be used by the UE to indicate a participation status of the UE associated with at least one federated learning round corresponding to a machine learning component (block 610). For example, the base station (e.g., using second communication manager 150 and/or transmission component 804, depicted in FIG. 8) may transmit, to a UE, a federated learning configuration that configures a participation indication to be used by the UE to indicate a participation status of the UE associated with at least one federated learning round corresponding to a machine learning component, as described above.

As further shown in FIG. 6, in some aspects, process 600 may include receiving the participation indication from the UE based at least in part on the federated learning configuration (block 620). For example, the base station (e.g., using second communication manager 150 and/or reception component 802, depicted in FIG. 8) may receive the participation indication from the UE based at least in part on the federated learning configuration, as described above.

Process 600 may include additional aspects, such as any single aspect or any combination of aspects described below and/or in connection with one or more other processes described elsewhere herein.

In a first aspect, the at least one federated learning round comprises at least one of a prior federated learning round or a future federated learning round.

In a second aspect, alone or in combination with the first aspect, the participation indication comprises an indication that the UE participated in a prior federated learning round, or an indication that the UE did not participate in the prior federated learning round.

In a third aspect, alone or in combination with one or more of the first and second aspects, the participation indication comprises an indication that the UE will participate in a future federated learning round, or an indication that the UE will not participate in the future federated learning round.

In a fourth aspect, alone or in combination with one or more of the first through third aspects, receiving the participation indication comprises receiving the participation indication before an occurrence of an OTA aggregation occasion.

In a fifth aspect, alone or in combination with one or more of the first through third aspects, receiving the participation indication comprises receiving the participation indication after an occurrence of an OTA aggregation occasion and before a federated averaging instance associated with a last federated learning round.

In a sixth aspect, alone or in combination with the fifth aspect, the federated learning configuration indicates a participation indication deadline that is based at least in part on the federated averaging instance.

In a seventh aspect, alone or in combination with one or more of the first through sixth aspects, receiving the participation indication comprises receiving at least one of a PUCCH communication that includes the participation indication or a MAC CE that includes the participation indication.

In an eighth aspect, alone or in combination with one or more of the first through seventh aspects, the participation indication comprises at least one of an indication that the UE did not participate in a prior federated learning round or an indication that the UE will not participate in a future federated learning round, and the participation indication comprises participation status information associated with the participation status.

In a ninth aspect, alone or in combination with the eighth aspect, the participation status information includes at least one of an indication of a poor channel condition, an indication that an update associated with the machine learning component is not ready, an indication of a low UE battery, or an indication of an adverse maximum permissible exposure condition.

In a tenth aspect, alone or in combination with the ninth aspect, the participation status information includes the indication of the poor channel condition, and process 600 includes excluding the UE from the future federated learning round based at least in part on the participation status information.

In an eleventh aspect, alone or in combination with one or more of the ninth through tenth aspects, the UE is associated with a first OTA aggregation group, and the participation status information includes the indication that the update associated with the machine learning component is not ready, and process 600 includes associating the UE with a second OTA aggregation group based at least in part on the participation status information.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
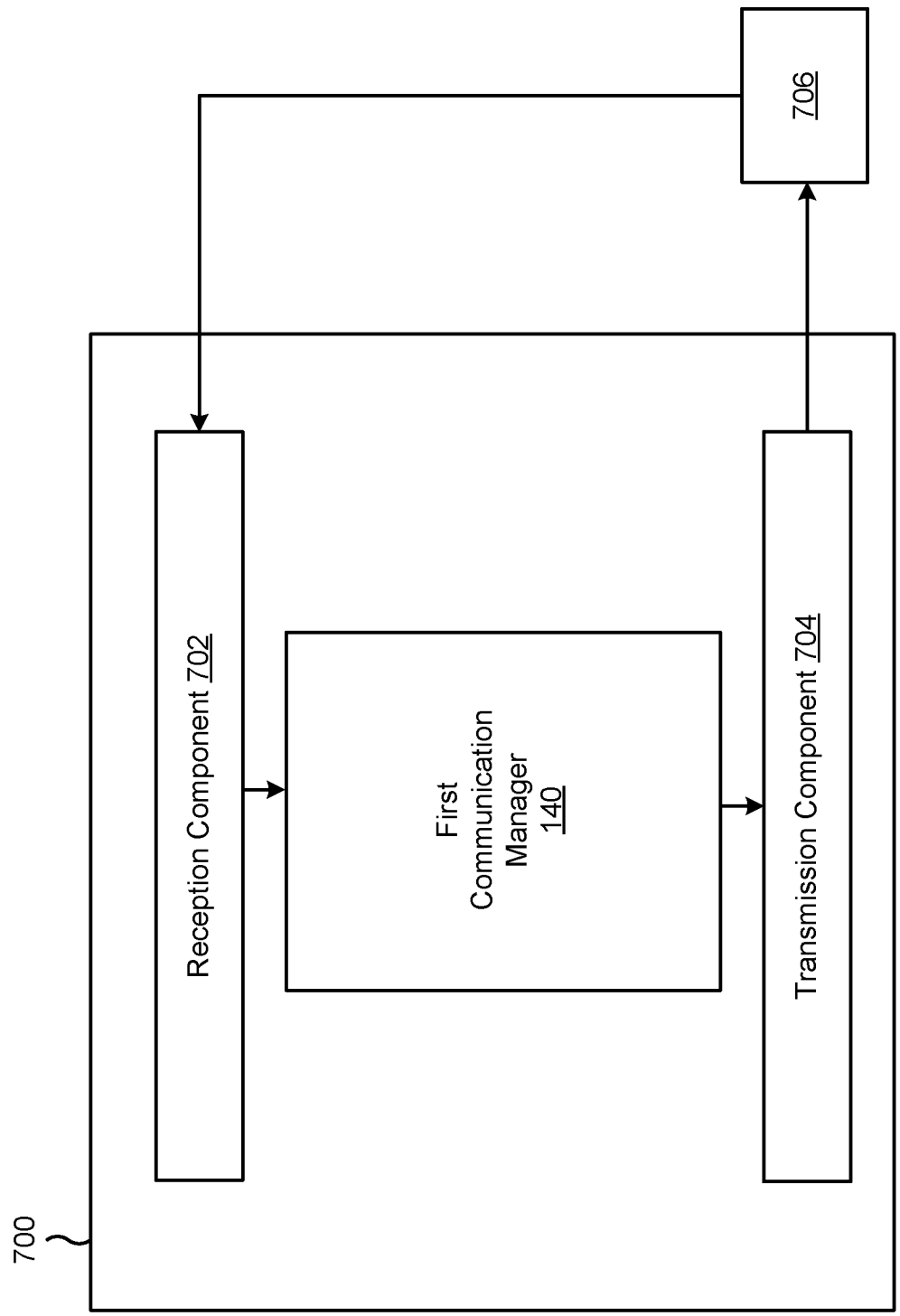
FIGS. 7 and 8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the first communication manager 140.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The first communication manager 140 and/or the reception component 702 may receive, from a base station, a federated learning configuration that configures a participation indication to be used by the UE to indicate a participation status of the UE associated with at least one federated learning round corresponding to a machine learning component. The first communication manager 140 and/or transmission component 704 may transmit the participation indication to the base station based at least in part on the federated learning configuration. In some aspects, the first communication manager 140 may include one or more antennas, a modem, a modulator, a transmit MIMO processor, a transmit processor, a controller/processor, a memory, or a combination thereof, of the UE described in connection with FIG. 2. In some aspects, the first communication manager 140 may include the reception component 702 and/or the transmission component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
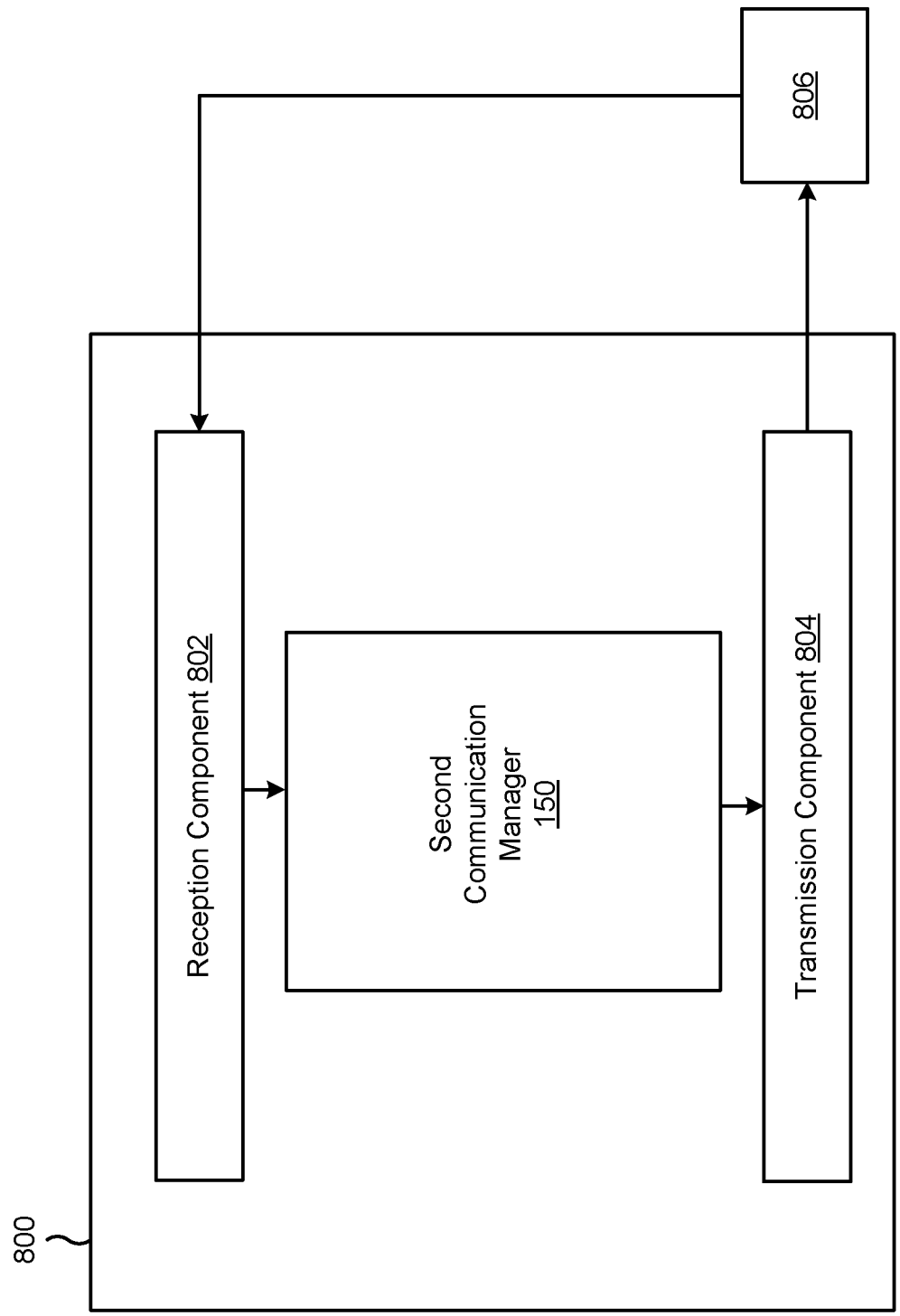

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the second communication manager 150.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The second communication manager 150 and/or the transmission component 804 may transmit, to a UE, a federated learning configuration that configures a participation indication to be used by the UE to indicate a participation status of the UE associated with at least one federated learning round corresponding to a machine learning component. The second communication manager 150 and/or reception component 802 may receive the participation indication from the UE based at least in part on the federated learning configuration. In some aspects, the second communication manager 150 may include one or more antennas, a modem, a modulator, a transmit MIMO processor, a transmit processor, a controller/processor, a memory, or a combination thereof, of the base station described in connection with FIG. 2. In some aspects, the second communication manager 150 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a base station, a federated learning configuration that configures a participation indication to be used by the UE to indicate a participation status of the UE associated with at least one federated learning round corresponding to a machine learning component; and transmitting the participation indication to the base station based at least in part on the federated learning configuration.

Aspect 2: The method of Aspect 1, wherein the at least one federated learning round comprises at least one of a prior federated learning round or a future federated learning round.

Aspect 3: The method of either of Aspects 1 or 2, wherein the participation indication comprises: an indication that the UE participated in a prior federated learning round, or an indication that the UE did not participate in the prior federated learning round.

Aspect 4: The method of any of Aspects 1-3, wherein the participation indication comprises: an indication that the UE will participate in a future federated learning round, or an indication that the UE will not participate in the future federated learning round.

Aspect 5: The method of any of Aspects 1-4, wherein transmitting the participation indication comprises transmitting the participation indication before an occurrence of an over-the-air aggregation occasion.

Aspect 6: The method of any of Aspects 1-4, wherein transmitting the participation indication comprises transmitting the participation indication after an occurrence of an over-the-air aggregation occasion and before a federated averaging instance associated with a last federated learning round.

Aspect 7: The method of Aspect 6, wherein the federated learning configuration indicates a participation indication deadline that is based at least in part on the federated averaging instance.

Aspect 8: The method of any of Aspects 1-7, wherein transmitting the participation indication comprises transmitting at least one of a physical uplink control channel communication that includes the participation indication or a medium access control control element that includes the participation indication.

Aspect 9: The method of any of Aspects 1-8, wherein the participation indication comprises at least one of an indication that the UE did not participate in a prior federated learning round or an indication that the UE will not participate in a future federated learning round, and wherein the participation indication comprises participation status information associated with the participation status.

Aspect 10: The method of Aspect 9, wherein the participation status information includes at least one of: an indication of a poor channel condition, an indication that an update associated with the machine learning component is not ready, an indication of a low UE battery, or an indication of an adverse maximum permissible exposure condition.

Aspect 11: A method of wireless communication performed by a base station, comprising: transmitting, to a user equipment (UE), a federated learning configuration that configures a participation indication to be used by the UE to indicate a participation status of the UE associated with at least one federated learning round corresponding to a machine learning component; and receiving the participation indication from the UE based at least in part on the federated learning configuration.

Aspect 12: The method of Aspect 11, wherein the at least one federated learning round comprises at least one of a prior federated learning round or a future federated learning round.

Aspect 13: The method of either of Aspects 11 or 12, wherein the participation indication comprises: an indication that the UE participated in a prior federated learning round, or an indication that the UE did not participate in the prior federated learning round.

Aspect 14: The method of any of Aspects 11-13, wherein the participation indication comprises: an indication that the UE will participate in a future federated learning round, or an indication that the UE will not participate in the future federated learning round.

Aspect 15: The method of any of Aspects 11-13, wherein receiving the participation indication comprises receiving the participation indication before an occurrence of an over-the-air aggregation occasion.

Aspect 16: The method of any of Aspects 11-13, wherein receiving the participation indication comprises receiving the participation indication after an occurrence of an over-the-air aggregation occasion and before a federated averaging instance associated with a last federated learning round.

Aspect 17: The method of Aspect 16, wherein the federated learning configuration indicates a participation indication deadline that is based at least in part on the federated averaging instance.

Aspect 18: The method of any of Aspects 11-17, wherein receiving the participation indication comprises receiving at least one of a physical uplink control channel communication that includes the participation indication or a medium access control control element that includes the participation indication.

Aspect 19: The method of any of Aspects 11-18, wherein the participation indication comprises at least one of an indication that the UE did not participate in a prior federated learning round or an indication that the UE will not participate in a future federated learning round, and wherein the participation indication comprises participation status information associated with the participation status.

Aspect 20: The method of Aspect 19, wherein the participation status information includes at least one of: an indication of a poor channel condition, an indication that an update associated with the machine learning component is not ready, an indication of a low UE battery, or an indication of an adverse maximum permissible exposure condition.

Aspect 21: The method of Aspect 20, wherein the participation status information includes the indication of the poor channel condition, the method further comprising excluding the UE from the future federated learning round based at least in part on the participation status information.

Aspect 22: The method of either of Aspects 20 or 21, wherein the UE is associated with a first over-the-air aggregation group, and wherein the participation status information includes the indication that the update associated with the machine learning component is not ready, the method further comprising associating the UE with a second over-the-air aggregation group based at least in part on the participation status information.

Aspect 23: An apparatus for wireless communication at a device, comprising a processor; memory coupled with the processor; and instructions stored in the memory and executable by the processor to cause the apparatus to perform the method of one or more of Aspects 1-10.

Aspect 24: A device for wireless communication, comprising a memory and one or more processors coupled to the memory, the one or more processors configured to perform the method of one or more of Aspects 1-10.

Aspect 25: An apparatus for wireless communication, comprising at least one means for performing the method of one or more of Aspects 1-10.

Aspect 26: A non-transitory computer-readable medium storing code for wireless communication, the code comprising instructions executable by a processor to perform the method of one or more of Aspects 1-10.

Aspect 27: A non-transitory computer-readable medium storing a set of instructions for wireless communication, the set of instructions comprising one or more instructions that, when executed by one or more processors of a device, cause the device to perform the method of one or more of Aspects 1-10.

Aspect 28: An apparatus for wireless communication at a device, comprising a processor; memory coupled with the processor; and instructions stored in the memory and executable by the processor to cause the apparatus to perform the method of one or more of Aspects 11-22.

Aspect 29: A device for wireless communication, comprising a memory and one or more processors coupled to the memory, the one or more processors configured to perform the method of one or more of Aspects 11-22.

Aspect 30: An apparatus for wireless communication, comprising at least one means for performing the method of one or more of Aspects 11-22.

Aspect 31: A non-transitory computer-readable medium storing code for wireless communication, the code comprising instructions executable by a processor to perform the method of one or more of Aspects 11-22.

Aspect 32: A non-transitory computer-readable medium storing a set of instructions for wireless communication, the set of instructions comprising one or more instructions that, when executed by one or more processors of a device, cause the device to perform the method of one or more of Aspects 11-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, a federated learning configuration that configures a participation indication to be used by the UE to indicate a participation status of the UE associated with at least one federated learning round corresponding to a machine learning component; and
   transmitting the participation indication to the base station based at least in part on the federated learning configuration;
   wherein transmitting the participation indication comprises transmitting the participation indication after an occurrence of an over-the-air aggregation occasion and before a federated averaging instance associated with a last federated learning round.

2. The method of claim 1, wherein the at least one federated learning round comprises at least one of a prior federated learning round or a future federated learning round.

3. The method of claim 1, wherein the participation indication comprises:
an indication that the UE participated in a prior federated learning round, or
an indication that the UE did not participate in the prior federated learning round.

4. The method of claim 1, wherein the participation indication comprises:
an indication that the UE will participate in a future federated learning round, or
an indication that the UE will not participate in the future federated learning round.

5. The method of claim 1, wherein transmitting the participation indication comprises transmitting the participation indication before an occurrence of an over-the-air aggregation occasion.

6. The method of claim 1, wherein the federated learning configuration indicates a participation indication deadline that is based at least in part on the federated averaging instance.

7. The method of claim 1, wherein transmitting the participation indication comprises transmitting at least one of a physical uplink control channel communication that includes the participation indication or a medium access control control element that includes the participation indication.

8. The method of claim 1, wherein the participation indication comprises at least one of an indication that the UE did not participate in a prior federated learning round or an indication that the UE will not participate in a future federated learning round, and wherein the participation indication comprises participation status information associated with the participation status.

9. The method of claim 8, wherein the participation status information includes at least one of:
an indication of a poor channel condition,
an indication that an update associated with the machine learning component is not ready,
an indication of a low UE battery, or
an indication of an adverse maximum permissible exposure condition.

10. A method of wireless communication performed by a base station, comprising:
transmitting, to a user equipment (UE), a federated learning configuration that configures a participation indication to be used by the UE to indicate a participation status of the UE associated with at least one federated learning round corresponding to a machine learning component; and
receiving the participation indication from the UE based at least in part on the federated learning configuration;
wherein receiving the participation indication comprises receiving the participation indication after an occurrence of an over-the-air aggregation occasion and before a federated averaging instance associated with a last federated learning round.

11. The method of claim 10, wherein the at least one federated learning round comprises at least one of a prior federated learning round or a future federated learning round.

12. The method of claim 10, wherein the participation indication comprises:
an indication that the UE participated in a prior federated learning round, or
an indication that the UE did not participate in the prior federated learning round.

13. The method of claim 10, wherein the participation indication comprises:
an indication that the UE will participate in a future federated learning round, or
an indication that the UE will not participate in the future federated learning round.

14. The method of claim 10, wherein receiving the participation indication comprises receiving the participation indication before an occurrence of an over-the-air aggregation occasion.

15. The method of claim 10, wherein the federated learning configuration indicates a participation indication deadline that is based at least in part on the federated averaging instance.

16. The method of claim 10, wherein receiving the participation indication comprises receiving at least one of a physical uplink control channel communication that includes the participation indication or a medium access control control element that includes the participation indication.

17. The method of claim 10, wherein the participation indication comprises at least one of an indication that the UE did not participate in a prior federated learning round or an indication that the UE will not participate in a future federated learning round, and wherein the participation indication comprises participation status information associated with the participation status.

18. The method of claim 17, wherein the participation status information includes at least one of:
an indication of a poor channel condition,
an indication that an update associated with the machine learning component is not ready,
an indication of a low UE battery, or
an indication of an adverse maximum permissible exposure condition.

19. The method of claim 18, wherein the participation status information includes the indication of the poor channel condition, the method further comprising excluding the UE from the future federated learning round based at least in part on the participation status information.

20. The method of claim 18, wherein the UE is associated with a first over-the-air aggregation group, and wherein the participation status information includes the indication that the update associated with the machine learning component is not ready, the method further comprising associating the UE with a second over-the-air aggregation group based at least in part on the participation status information.

* * * * *